US007118017B1

(12) United States Patent
Geraghty et al.

(10) Patent No.: US 7,118,017 B1
(45) Date of Patent: Oct. 10, 2006

(54) PENETRATION RESISTANT TRUNK PACK FOR POLICE VEHICLES

(75) Inventors: Brian Geraghty, Grosse Pointe Shores, MI (US); Jack B. Ridenour, Dearborn, MI (US); Roger Chen, Troy, MI (US); Saeed David Barbat, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 10/604,103

(22) Filed: Jun. 26, 2003

(51) Int. Cl.
*B60R 7/02* (2006.01)
*B60R 11/06* (2006.01)
*B65D 25/04* (2006.01)

(52) U.S. Cl. .................. 224/542; 220/505; 220/524; 220/528; 224/543; 296/37.1

(58) Field of Classification Search ............ 224/42.13, 224/404, 539, 542, 543, 544; 280/727, 783, 280/784; 296/37.1, 187.07, 187.11; 220/503, 220/505, 524, 528, 555, 556; 229/120.03
See application file for complete search history.

(56) References Cited

U.S. PATENT DOCUMENTS

| 2,950,852 | A | * | 8/1960 | Hutchison .................. 229/199 |
| 3,390,810 | A | * | 7/1968 | Schnceweiss .......... 229/120.03 |
| 3,622,035 | A | * | 11/1971 | Suter ........................ 280/834 |
| 3,823,817 | A | * | 7/1974 | Hughes ...................... 206/349 |
| 4,303,367 | A | * | 12/1981 | Bott ........................... 414/522 |
| 4,543,798 | A | * | 10/1985 | Page .......................... 62/239 |
| 4,757,938 | A | * | 7/1988 | Collins ....................... 229/199 |
| 4,832,242 | A | | 5/1989 | Leek .......................... 224/311 |
| 4,848,587 | A | * | 7/1989 | Nipp .......................... 206/571 |
| 4,848,626 | A | * | 7/1989 | Waters ....................... 224/404 |
| 4,884,733 | A | | 12/1989 | Geeves ....................... 224/311 |
| 4,911,296 | A | * | 3/1990 | Hart, Jr. ..................... 224/542 |
| 5,027,972 | A | * | 7/1991 | Bartholomew ............. 220/526 |
| 5,149,203 | A | * | 9/1992 | Sacks ......................... 383/111 |
| 5,167,433 | A | * | 12/1992 | Ryan .......................... 296/37.1 |
| 5,381,940 | A | | 1/1995 | Wright ....................... 224/42.42 |
| 5,535,931 | A | * | 7/1996 | Barlow et al. .............. 224/404 |
| 5,699,959 | A | * | 12/1997 | Huspeka et al. ........ 229/125.26 |
| 5,703,316 | A | * | 12/1997 | Madden, Jr. ............... 89/36.08 |
| 6,041,987 | A | | 3/2000 | Tickoo ....................... 224/542 |
| 6,237,991 | B1 | * | 5/2001 | Weber ....................... 296/187.12 |
| 6,401,994 | B1 | | 6/2002 | Moulton ..................... 224/315 |
| 6,502,886 | B1 | * | 1/2003 | Bleau et al. ................ 296/37.3 |
| 6,733,060 | B1 | * | 5/2004 | Pavkov et al. ............. 296/37.16 |
| 6,752,304 | B1 | * | 6/2004 | Hotary et al. .............. 224/544 |

* cited by examiner

Primary Examiner—Gary E. Elkins
(74) Attorney, Agent, or Firm—Gigette M. Bejin; Miller Lawgroup, PLLC

(57) ABSTRACT

A trunk organizer for the trunk cavity of a police vehicle that forces the orientation of long, stiff items typically carried within the trunk cavity of police vehicles into a transversely extending orientation. The transverse orientation of these items typically found in police vehicle trunks reduces the likelihood of a high speed rear collision driving the items through the walls defining the trunk cavity, particularly the waterfall of the trunk cavity, into the fuel tank. The trunk organizer is preferably formed from high density polyethylene with a forward panel of Kevlar affixed to the front panel of the trunk organizer to provide further penetration resistance. Translucent lids provide a ready inspection of the items without requiring the opening of a compartment. The trunk organizer is sized and configured to fit snuggly within the trunk cavity of a conventional police vehicle and permits an easy removal therefrom.

16 Claims, 5 Drawing Sheets

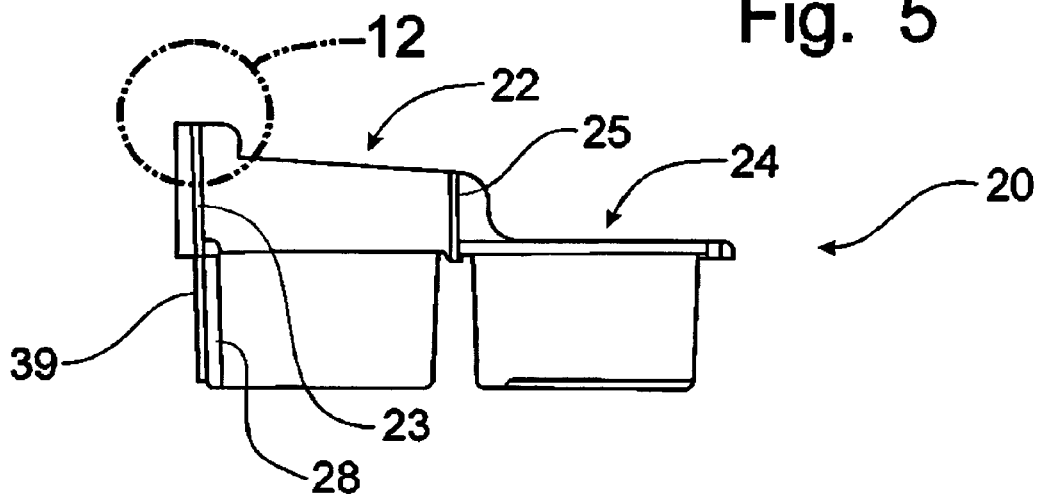
Fig. 5
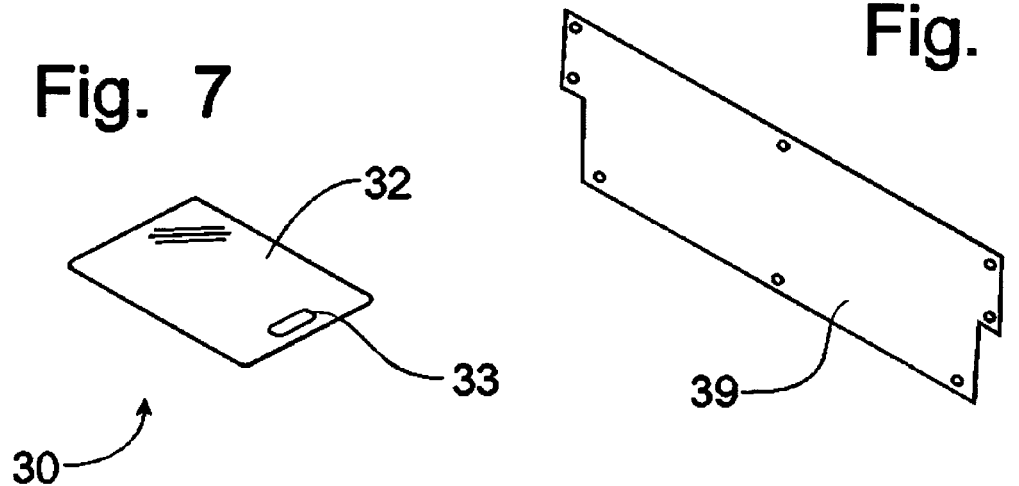
Fig. 6
Fig. 7
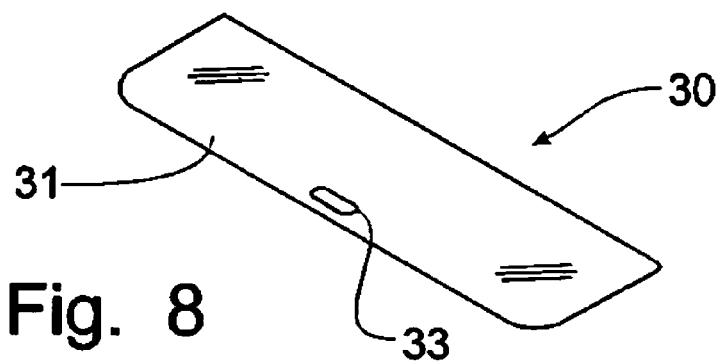
Fig. 8

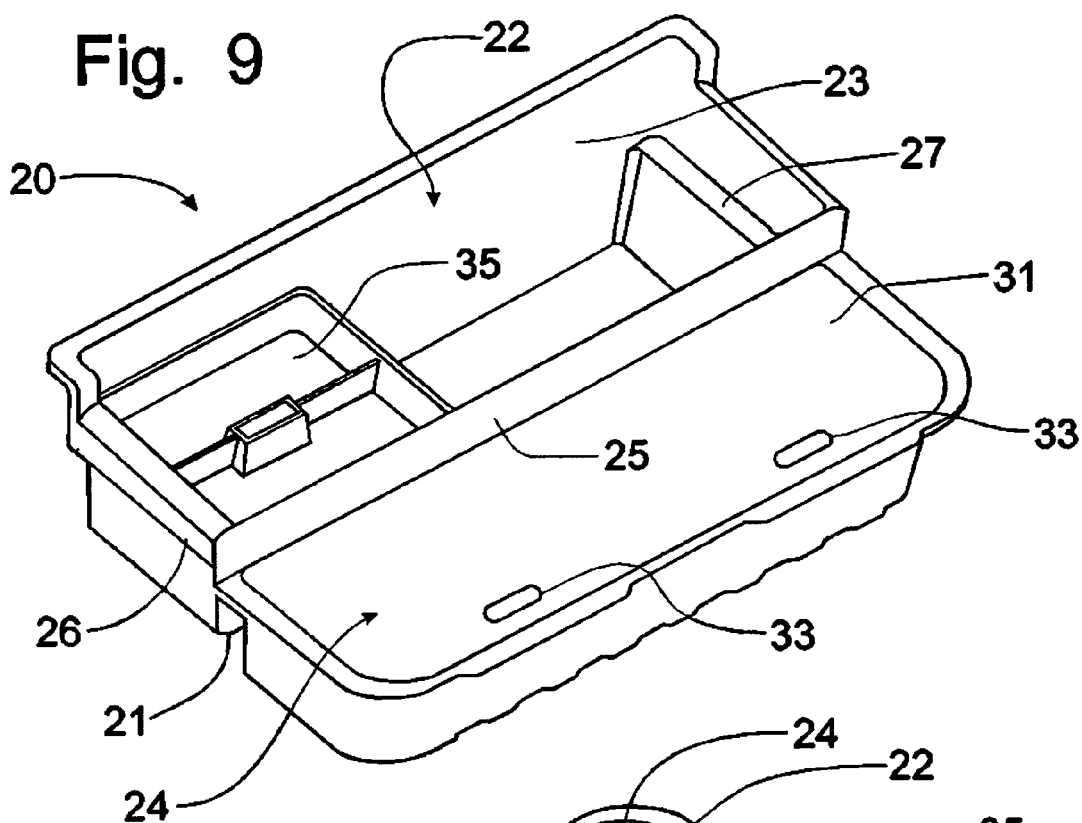
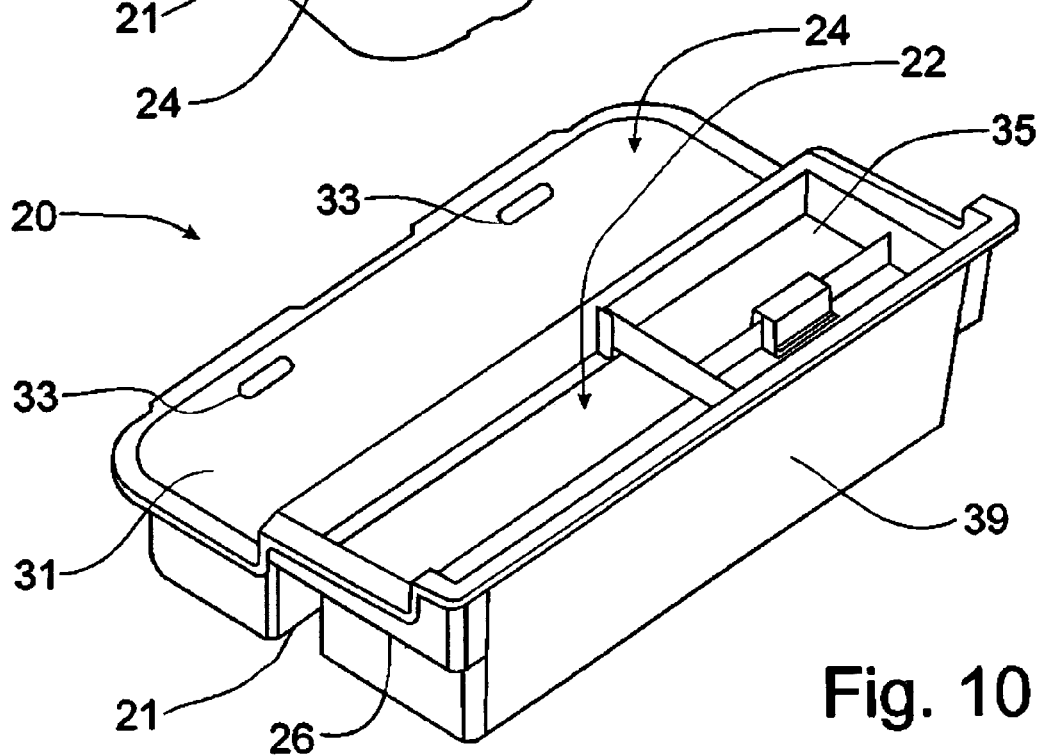

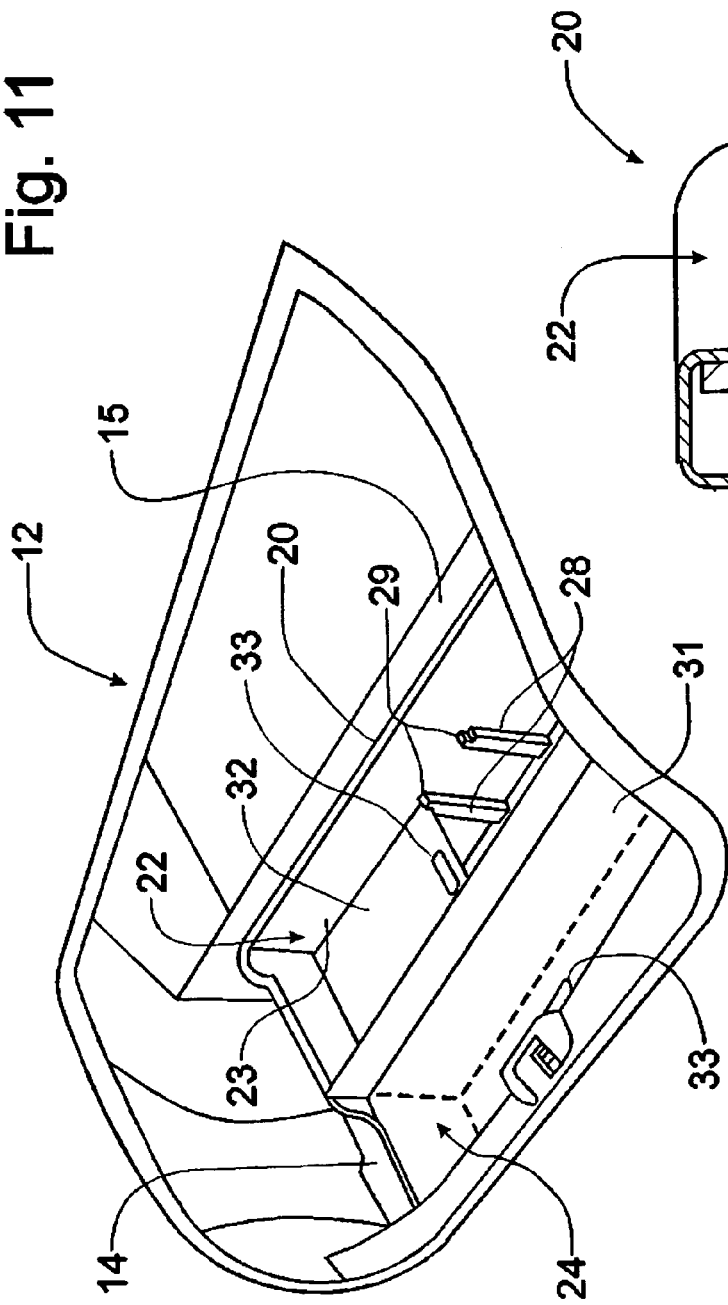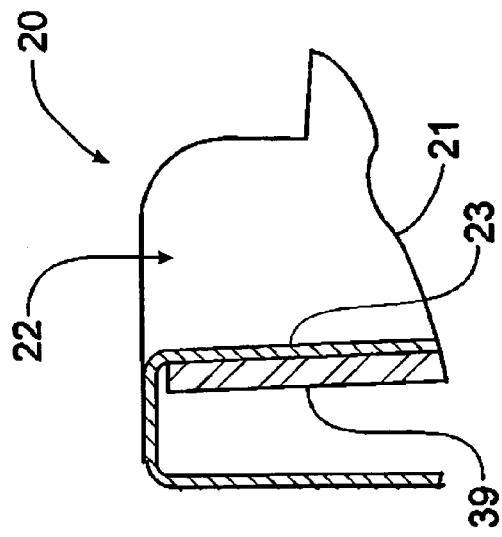

PENETRATION RESISTANT TRUNK PACK FOR POLICE VEHICLES

BACKGROUND OF INVENTION

Police vehicles, such as Crown Victoria Police Interceptors manufactured by Ford Motor Company, due to the particular use of the vehicle have been involved in rear end collisions at high speeds. Police vehicles typically carry unique items in the trunk cavity, such as a hydraulic jack, a cross-spinner lug wrench, hard edge radio boxes, fire extinguishers, shovels, flares, first aid kits, etc., some of which are capable of penetrating the walls of the trunk defining the trunk cavity and puncturing the fuel tank of the vehicle. The lack of containment of these unique items within the trunk cavity can result in leakage of gasoline from the fuel tank and the result possibility of fire.

The likelihood of any particular item within the trunk cavity penetrating the walls of the trunk cavity and puncturing the fuel tank is enhanced when the items within the trunk cavity are oriented longitudinally, i.e. parallel to the direction of travel of the vehicle, within the trunk cavity. The energy imparted to the items within the trunk cavity during a high speed rear end collision with the police vehicle can propel these items longitudinally within the trunk cavity and be driven into and through the forward walls of the trunk cavity and possibly into the fuel tank.

The reduction of the risk for one of these unique items to puncture the vehicle fuel tank can be attained by use of a trunk organizer that requires orientation of these items to extend transversely, rather than longitudinally. Further reduction of the possibility of puncture of the police vehicle fuel tank can be attained by providing a trunk organizer that is resistant to being penetrated by these unique items, thus maintaining these items within the confines of the trunk cavity.

Portable trunk organizers for vehicles are known in the prior art, as is represented by U.S. Pat. No. 4,832,242, issued to Thomas Leek on May 23, 1989, and by U.S. Pat. No. 4,884,733, issue to Garry Geeves on Dec. 5, 1989. The Leek patent is directed to a portable trunk organizer that stores items often carried in a trunk cavity, including first aid kits, flares, jumper cables, and the like. This organizer has a plurality of compartments for restraining a number of such items, and is formed with a bottom tray supported on legs on the floor of the trunk cavity and a top lid that is carried by the trunk lid for engagement with the bottom tray in an abutting relationship. The Geeves patent also teaches a compartmentalized organizer structure. Neither the Leek patent nor the Geeves patent teach that items within the trunk cavity should be transversely oriented, nor does either the Leek or Geeves patent contain any teaching for a penetration resistant organizer structure.

U.S. Pat. No. 5,381,940, issued to David Wright on Jan. 17, 1995, depicts a formed tray for disposal in the cargo area of a vehicle. The tray can be formed in a shape that will conform to the specific shape of the cargo area, such as the wheel wells, spare tire, and fuel tank, in order to prevent the tray from moving around in the vehicle cargo area. The tray contains formed sections or dividers that are sized and configured to receive boxes and other appropriate containers for carrying items within the cargo area. While the material for forming the tray and the cover therefor, are preferably formed from "high impact, strong, lightweight plastic", this material will not provide resistance to penetration during a high speed rear impact. Furthermore, the Wright patent does not contain teachings for requiring the orientation of items within the trunk in a transverse manner.

Similarly, U.S. Pat. No. 6,041,987, issued to Sham Tickoo on Mar. 28, 2000, is directed to a tubular frame that is formed into an organizer structure on which divider plates are mounted to define compartmentalized spaces. The divider plates are transversely movable to enable the size of the compartments to be adjusted to accommodate different sizes of containers or items to be restrained within the compartments. This Tickoo patent contains no structure that requires orientation of items within the trunk cavity to be oriented transversely. Certainly, the tubular frame of the organizer structure is not puncture resistant and would not prevent or restrain items from penetrating the walls of the trunk cavity.

U.S. Pat. No. 6,401,994, issued to Joel Ham, et al on Jun. 11, 2002, is directed to an organizer structure for utilization on the outer surface of the trunk lid of police vehicles. This Ham organizer is provided with a locking apparatus that securely stores and transports weapons, contraband, evidence, or miscellaneous personal property from one location to another. The organizer is provided with lids covering individual lockable compartments. The organizer is mounted to the exterior surface of the trunk lid through bolts which extend into the interior of the trunk cavity to secure the organizer in a manner that cannot be removed from the trunk lid so long as the lid of the organizer is closed. Ham contains no suggestions for organizing items within the trunk cavity of a police vehicle and does not incorporate any penetration resistant device into the structure of the organizer.

Accordingly, it would be desirable to provide a trunk organizer for the trunk cavity of a police vehicle that will orient long items in a transverse manner, and will incorporate a penetration resistant member to restrain items within the organizer within the confines of the trunk cavity.

SUMMARY OF INVENTION

It is an object of this invention to overcome the aforementioned disadvantages of the known prior art by providing a trunk organizer for police vehicles that reduces the risk of items typically carried in the trunks of police vehicle from penetrating the walls defining the trunk cavity.

It is another object of this invention provide a police vehicle trunk organizer that requires the orientation of long, stiff items, such as shovels, lug wrenches, and hydraulic jacks, to be positioned in a transverse orientation to minimize the likelihood of penetration of the trunk walls.

It is an advantage of this invention that items typically carried in the trunk of a police vehicle are oriented in a certain manner to reduce the likelihood of a high speed rear collision driving the items through the walls defining the confines of the trunk cavity.

It is a feature of this invention that the trunk organizer is configured to fit snuggly within the trunk cavity of a police vehicle.

It is still another object of this invention to incorporate a penetration resistant panel into the forward wall of a trunk organizer to further reduce the likelihood of a high speed rear collision driving items within trunk organizer through the walls of the trunk cavity.

It is another feature of this invention that the police vehicle trunk organizer is compatible with vertical spare tire mounting within the trunk cavity.

It is still another feature of this invention that the trunk organizer can be manufactured from high density polyethylene through a vacuum-formation process.

It is yet another feature of this invention that the penetration resistant panel can be formed from Kevlar adhered to the forward panel of the trunk organizer.

It is another advantage of this invention that the trunk organizer can be easily removed from the trunk cavity of a police vehicle.

It is still another advantage of this invention that the trunk organizer is provided with translucent panels forming covers for the compartments defined by the trunk organizer to permit a casual inspection of the items carried within the respective compartments of the trunk organizer.

It is yet another object of this invention to provide a trunk organizer for police vehicles that reduces the likelihood of puncturing the fuel tank during high speed rear end collisions into the police vehicle.

It is a further object of this invention to provide a trunk pack for a police vehicle that organizes items within the trunk cavity that is durable in construction, inexpensive of manufacture, carefree of maintenance, facile in assemblage, and simple and effective in use.

These and other objects, features and advantages are accomplished according to the instant invention by providing a trunk organizer for the trunk cavity of a police vehicle that forces the orientation of long, stiff items typically carried within the trunk cavity of police vehicles into a transversely extending orientation. The transverse orientation of these items typically found in police vehicle trunks reduces the likelihood of a high speed rear collision driving the items through the walls defining the trunk cavity, particularly the waterfall of the trunk cavity, into the fuel tank. The trunk organizer is preferably formed from high density polyethylene with a forward panel of Kevlar affixed to the front panel of the trunk organizer to provide further penetration resistance. Translucent lids provide a ready inspection of the items without requiring the opening of a compartment. The trunk organizer is sized and configured to fit snuggly within the trunk cavity of a conventional police vehicle and permits an easy removal therefrom.

BRIEF DESCRIPTION OF DRAWINGS

The advantages of this invention will become apparent upon consideration of the following detailed disclosure of the invention, especially when taken in conjunction with the accompanying drawings wherein:

FIG. 5 is a schematic cross-sectional view of the trunk organizer corresponding to lines 5—5 of FIG. 4 to depict the side elevational profile of the trunk organizer;

FIG. 6 is a perspective detail view of the penetration resistant forward panel affixed to the front panel of the trunk organizer;

FIG. 7 is a perspective detail view of the half cover lid for use on the forward compartment of the trunk organizer;

FIG. 8 is a perspective detail view of the full cover lid for use on the rearward compartment of the trunk organizer;

FIG. 9 is a left rear perspective view of the trunk organizer depicted in FIGS. 3 8, the half cover lid being replaced with a removable tray;

FIG. 10 is a right front perspective view of the trunk organizer shown in FIG. 9;

FIG. 11 is a perspective view of the trunk cavity of a police vehicle similar to that of FIG. 2, but having the trunk organizer positioned within the trunk cavity; and FIG. 12 is an enlarged detail view of the upper portion of the rear panel of the trunk organizer corresponding to the encircled area identified by the circle 12 in FIG. 5.

DETAILED DESCRIPTION

Figure 1:
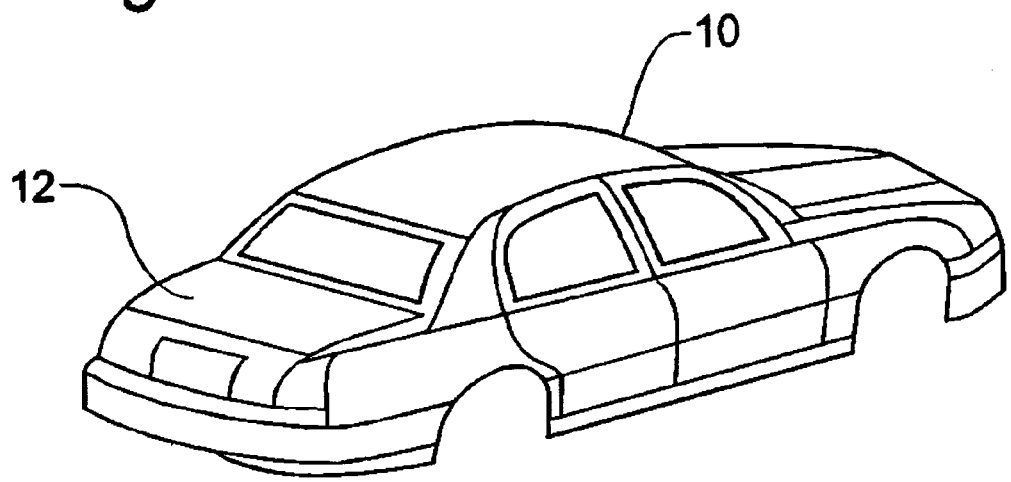
FIG. 1 is a schematic perspective view of a police vehicle in which the instant invention can be utilized.
Figure 2:
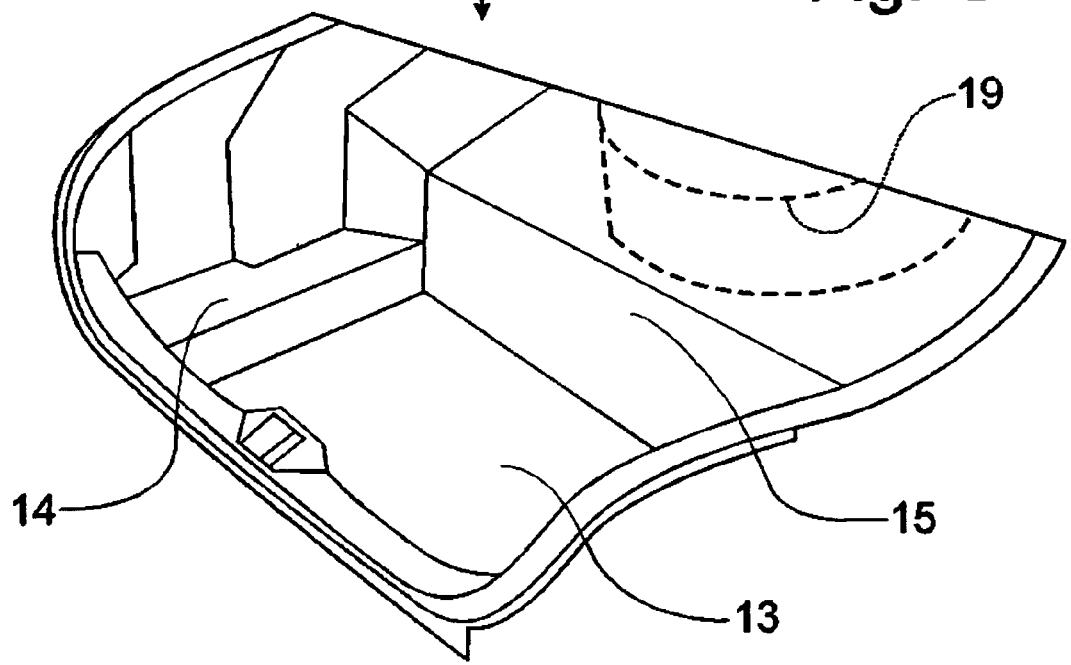
FIG. 2 is a perspective view of an opened trunk of the police vehicle depicted in FIG. 1.
Figure 3:
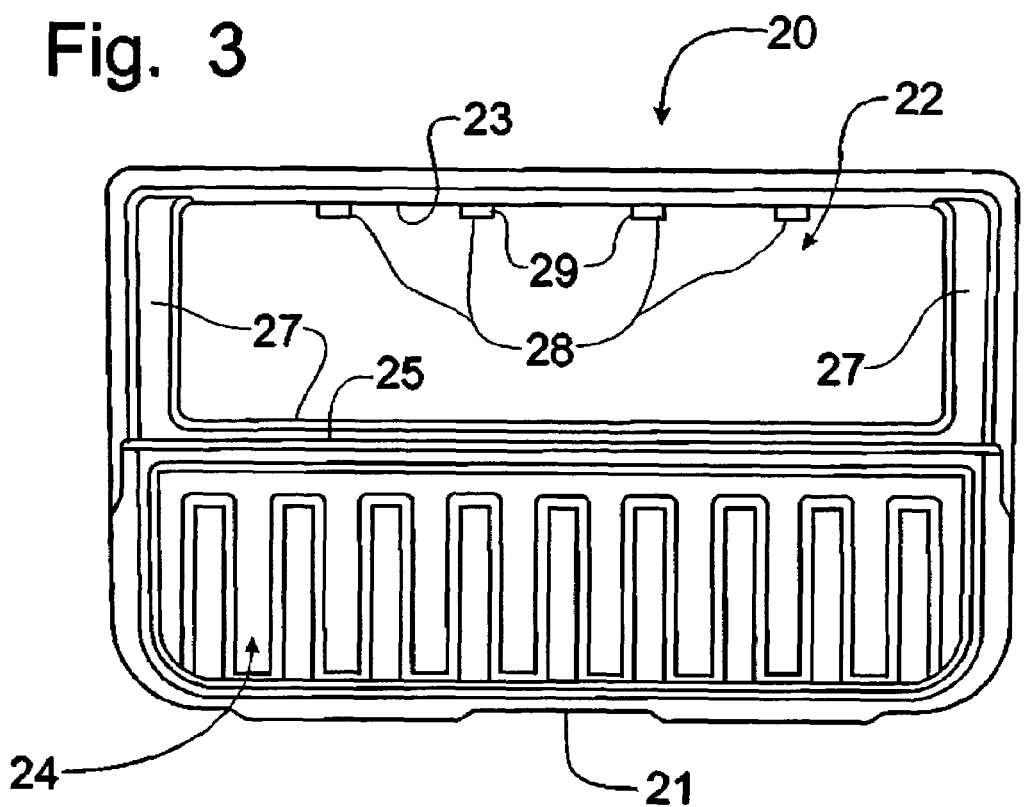
FIG. 3 is a top plan view of a trunk organizer incorporating the principles of the instant invention, the cover lids being removed for purposes of clarity.
Figure 4:
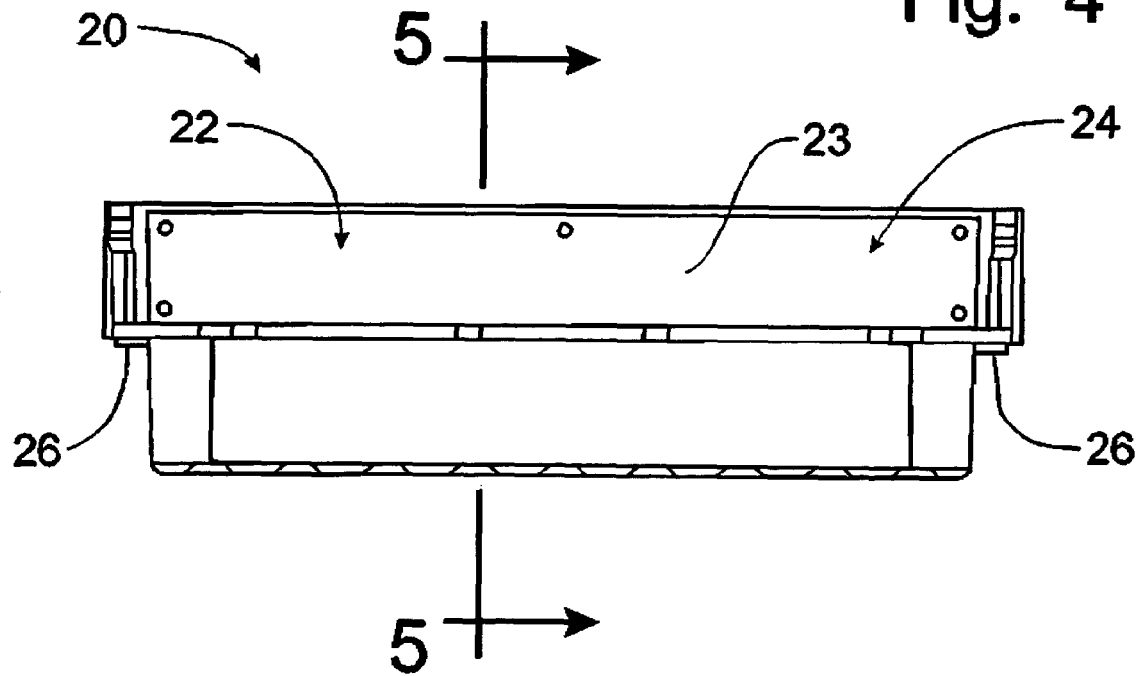
FIG. 4 is a rear elevational view of the trunk organizer depicted in FIG. 3, looking toward the front of the vehicle.

Referring to FIGS. 1–12, a trunk organizer incorporating the principles of the instant invention for utilization in a police vehicle can best be seen. A typical police vehicle 10, such as a Crown Victoria Police Interceptor manufactured by Ford Motor Company, can be seen in FIG. 1. The trunk 12 is located at the rear of the vehicle 10 and is shown in an open configuration in FIG. 2. The trunk 12 is formed in a particular shape to conform to the rear wheel wells, fuel tank and other components of the vehicle 10, and includes a generally vertical front wall 15, commonly referred to as the waterfall.

The fuel tank (not shown) is typically positioned forwardly of the waterfall 15. Accordingly, any item within the confines of the trunk that would penetrate the waterfall 15 can potentially puncture the structure of the fuel tank (not shown) and present a fire hazard. Police vehicles are often involved in high speed pursuits and, as a result, encounter a disproportionately high number of high speed rear end collisions where an object impacts the rear bumper 11 of the vehicle 10 at a relatively high rate of speed.

Such high speed collisions can drive items carried within the confines the trunk cavity 12 of the vehicle 10 through the waterfall 15 and into the fuel tank (not shown). The likelihood of an item within the trunk 12 being driven through the waterfall 15 is increased when the item is a long stiff device, such as a shovel, a lug wrench or a hydraulic jack, all of which are typically carried within the trunk 12 of a police vehicle 10, and that item is oriented longitudinally, i.e. parallel to the direction of travel of the vehicle 10.

As best seen in FIGS. 3–12, a trunk organizer 20 for use in the Crown Victoria Police Interceptor can best be seen. The trunk organizer 20 is formed into two transversely extending compartments 22, 24 positioned in a fore-and-aft relationship. A central barrier 25 extends vertically above both compartments 22, 24 to provide a physical divider between the front compartment 22 and the rear compartment 24. Both compartments 22, 24 are provided with support ledges 27 extending at least partially around the perimeter of each compartment 22, 24 to support a cover lid 30 or tray 35 in an elevated position above the bottom of the respective compartment 22, 24.

The transverse orientation of the compartments 22, 24 will require that long, stiff items such as a shovel, lug wrench or hydraulic jack (not shown) will be stored within the compartment 22, 24 in a transversely extending manner, as such items will not fit within the compartments 22, 24 in a longitudinally extending manner. The vertically extending central divider barrier 25 provides a distinct separation between the fore-and-aft compartments 22, 24 and because the barrier 25 extends above both compartments 22, 24, these long stiff items cannot be laid longitudinally across both compartments 22, 24. Thus, such items will be laterally oriented when stored in the trunk organizer 20.

Each compartment 22, 24 can be equipped with a cover lid 30 that can be a full length version 31, as depicted in FIG. 8, or a half length version 32, as depicted in FIG. 7. The cover 30 is provided with at least one handle opening 33 to permit a grasping of the lid 30 for removal from the compartment 22, 24. Preferably, the front compartment 22 will be provided with the full length version 31, while the rear compartment can be equipped with either the half length version 32 or the tray 35, which is also configured to cover half the transverse length of the rear compartment 24.

To facilitate the use of a half length lid 32, or the tray 35, the rear compartment 24 can be formed with a support member 28 that has a stop 29 that prevents the movement of the lid 32 or tray 35 laterally across the compartment 24. The half lid 32 can also support additional items on top of the lid 32, while other items are housed in the compartment 24 beneath the lid 32. While the rear compartment 24 can be formed with just a single support member 28, which would permit the use of a half lid 32 on only one side of the rear compartment 24, a second support member 28a can be provided to permit use of either two separate half lids 32 or the alternative use of a single half lid 32 on either side of the rear compartment 24.

The cover lids 31, 32 are preferably formed of a transparent or translucent plastic, such as acrylic, to permit the viewing of the items within the respective compartment 22, 24 beneath the lid 31, 32 without requiring the removal of the lid 31, 32 from the trunk organizer 20. Further, the center divider 25 is preferably formed of such transparent or translucent plastic material so as to not hinder the viewing of the items in the rear compartment 24 from outside the trunk 12, due to the extension of the divider 25 above the body 21 of the trunk organizer 20.

Preferably, the body 21 of the trunk organizer 20 is formed from vacuum-formed high density polyethylene, which provides a limited amount of penetration resistance from articles housed within the compartments 22, 24. To provide an enhanced penetration resistance with respect to the waterfall 15, the forward wall 23 of the front compartment 22 has affixed thereto a panel 39 formed from a material that is highly resistant to penetration, such as Kevlar, a material used in bullet-proof vests. Accordingly, any article or item within the compartments 22, 24 would be deflected by the reinforcement panel 39 from the forward wall 23 of the trunk organizer 20 during the incidence of a rear collision into the trunk 12 of the vehicle 10, and not be directed into the waterfall 15 and possibly into the fuel tank (not shown) forwardly of the waterfall 15.

In operation, the trunk organizer 20 is placed into the trunk 12 of the vehicle 10 with the reinforcement panel 39 positioned against the waterfall 15. The size of the trunk organizer 20 is such that the organizer 20 covers substantially the entire floor 13 of the trunk 12. The body 21 of the trunk organizer 20 can be formed with side overhangs 26 that are sized to be supported on the upper side ledges 14 of the trunk 12. The spare tire 19, depicted in dashed lines in FIG. 2, will not present an interference with the utilization of the organizer 20. Long, stiff items, such as a shovel, fire extinguisher, hydraulic jack, lug wrench, can be placed in the bottom of either the front or rear compartments 22, 24 of the organizer 20 in a transverse orientation covered by the lids 31, 32. Taller items can be placed in the front compartment 22 on a side thereof not covered by a lid 32. Other smaller articles can be placed on top of the lids 31, 32, or in a tray 35 substituted for the lid 32.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A trunk organizer for an automotive vehicle comprising:
  a body formed of a first material into at least a pair of compartments having longitudinal and transverse dimensions, said transverse dimension being greater than said longitudinal dimension in all of said compartments such that a placement of an item into one of said compartments results in a transverse orientation of said item within said one compartment; and
  a front wall having a panel formed of aramid fiber attached thereto to provide a resistance to penetration of said front wall that is greater than the remaining portions of said body, said second material having a resistance to penetration that is greater than said first material.

2. The trunk organizer of claim 1 wherein said body is formed with a ledge extending around at least a portion of a periphery of each said compartments on which a lid can be seated to cover the corresponding said compartment.

3. The trunk organizer of claim 2 wherein said lid is translucent to permit viewing of the corresponding said compartment through said lid.

4. The trunk organizer of claim 1 wherein each said compartment is provided with a lid, one of said lids having a size that covers the entire said corresponding compartment, another of said lids having a size that covers only a portion of said corresponding compartment.

5. The trunk organizer of claim 4 wherein said one of said lids is formed as a tray to hold items on an upper surface thereof.

6. The trunk organizer of claim 1 further comprising a central divider barrier extending vertically from said body between said compartments.

7. The trunk organizer of claim 6 wherein said compartments are positioned in a fore-and-aft relationship including a front compartment and a rear compartment.

8. The trunk organizer of claim 7 wherein said central divider prevents said item from being supported across said front and rear compartments in a longitudinally extending orientation.

9. In a trunk organizer for placement in a trunk cavity of an automotive vehicle, said trunk organizer having a body being divided into at least two compartments, the improvement comprising:
  said compartments formed of a first material and being oriented in a fore-and-aft relationship including a front compartment and a rear compartment, each of said compartments having a longitudinal dimension and a transverse dimension, said transverse dimension of each of said compartments being greater than said longitudinal dimension, said front compartment including a front wall positionable against a waterfall wall of said trunk cavity, said front wall having a reinforcement panel formed from a material having a penetration resistant quality greater than said first material and being attached thereto to provide a resistance to penetration through said front wall substantially entirely along said transverse dimension of said front wall.

10. The trunk organizer of claim 9 wherein said reinforcement panel is formed of aramid fiber.

11. The trunk organizer of claim 9 wherein all remaining walls of each said compartment are formed of a material having a penetration resistance less than said reinforcement panel.

12. The trunk organizer of claim 11 wherein said compartments are formed with a ledge extending around at least a portion of a periphery of each said compartment to support a lid at an elevated portion above a bottom of the corresponding said compartment.

13. The trunk organizer of claim 12 wherein each said lid is formed of a material to permit a viewing of any items stored within said compartment beneath said lid.

14. The trunk organizer of claim 13 further comprising:
a central divider extending transversely between said front compartment and said rear compartment and extending generally vertically above at least one of said compartments to prevent one of said items from being positioned longitudinally across said front and rear compartments.

15. A trunk organizer for deployment in a waterfall wall of a trunk cavity in an automotive vehicle comprising:

a body formed of a high density polymer and being divided into at least two compartments oriented in a fore-and-aft relationship including a front compartment and a rear compartment, each of said compartments having a longitudinal dimension and a transverse dimension, said transverse dimension of each of said compartments being greater than said longitudinal dimension; and said front compartment includes a front wall positionable against said waterfall wall, said front wall having a reinforcement panel formed of aramid fiber and being attached thereto to provide a resistance to penetration through said front wall and into said waterfall wall.

16. The trunk organizer of claim 15 wherein each of said compartments are formed with a ledge extending around at least a portion of a periphery of each said compartment to support a lid at an elevated portion above a bottom of the corresponding said compartment, each said lid being formed of a material to permit viewing of items stored within said compartment through the corresponding said lid.

* * * * *